US008848096B2

(12) United States Patent
Nishio

(10) Patent No.: US 8,848,096 B2
(45) Date of Patent: Sep. 30, 2014

(54) IMAGE-PICKUP APPARATUS AND CONTROL METHOD THEREFOR

(75) Inventor: Akihiro Nishio, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 13/814,287

(22) PCT Filed: Apr. 12, 2012

(86) PCT No.: PCT/JP2012/060523
§ 371 (c)(1),
(2), (4) Date: Feb. 5, 2013

(87) PCT Pub. No.: WO2012/144539
PCT Pub. Date: Oct. 26, 2012

(65) Prior Publication Data

US 2013/0128097 A1 May 23, 2013

(30) Foreign Application Priority Data

Apr. 19, 2011 (JP) ................................ 2011-093509
Mar. 15, 2012 (JP) ................................ 2012-059105

(51) Int. Cl.

| | |
|---|---|
| ***H04N 5/232*** | (2006.01) |
| ***G03B 13/00*** | (2006.01) |
| ***H04N 5/369*** | (2011.01) |
| ***G03B 17/14*** | (2006.01) |
| ***G02B 7/34*** | (2006.01) |
| ***G03B 13/36*** | (2006.01) |

(52) U.S. Cl.
CPC ......... *H04N 5/23212* (2013.01); *H04N 5/3696* (2013.01); *G03B 17/14* (2013.01); *G03B 2206/00* (2013.01); *G02B 7/346* (2013.01); *G03B 13/36* (2013.01)
USPC ........................................ 348/350; 348/222.1

(58) Field of Classification Search
USPC .................. 348/207.99, 208.5, 222.1, 229.1, 348/345–357; 396/79–83, 88–152; 250/201.4, 201.6, 201.7; 352/139, 140; 359/696, 698; 382/255
See application file for complete search history.

(56) References Cited

U.S. PATENT DOCUMENTS

| | | | | |
|---|---|---|---|---|
| 2004/0179128 | A1* | 9/2004 | Oikawa | 348/345 |
| 2010/0045849 | A1* | 2/2010 | Yamasaki | 348/349 |
| 2010/0157094 | A1* | 6/2010 | Takamiya | 348/229.1 |
| 2012/0057043 | A1* | 3/2012 | Yamamoto | 348/222.1 |

FOREIGN PATENT DOCUMENTS

| | | | |
|---|---|---|---|
| JP | 60-125814 | A | 7/1985 |
| JP | 02-058012 | A | 2/1990 |
| JP | 2004-191629 | A | 7/2004 |
| JP | 2006-178211 | A | 7/2006 |

(Continued)

*Primary Examiner* — Dennis Hogue
(74) *Attorney, Agent, or Firm* — Cowan, Liebowitz & Latman, P.C.

(57) ABSTRACT

An image-pickup apparatus has an image sensor in which an image-pickup pixel and a focus detecting pixel are arrayed; a focus detection unit which detects a defocus amount of the imaging lens by a phase difference detection method using an output signal from the focus detecting pixel; and acquisition unit which acquires the ray vignetting information of the imaging lens. When the focus lens in the imaging lens is positioned within a position range in which the position of the focus lens cannot be detected, the focus detection unit detects the defocus amount of the imaging lens using the ray vignetting information in a position of the focus lens in which the amount of ray vignetting is the smallest within the position range.

9 Claims, 9 Drawing Sheets

(56) References Cited

FOREIGN PATENT DOCUMENTS

| | | |
|---|---|---|
| JP | 2007-240877 A | 9/2007 |
| JP | 2009-244862 A | 10/2009 |
| JP | 2010-286826 A | 12/2010 |

* cited by examiner

F I G. 6A
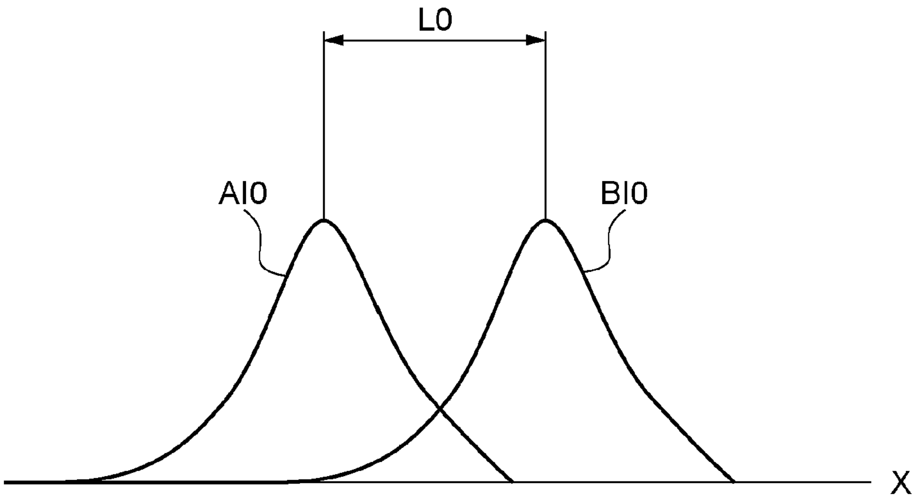
F I G. 6B
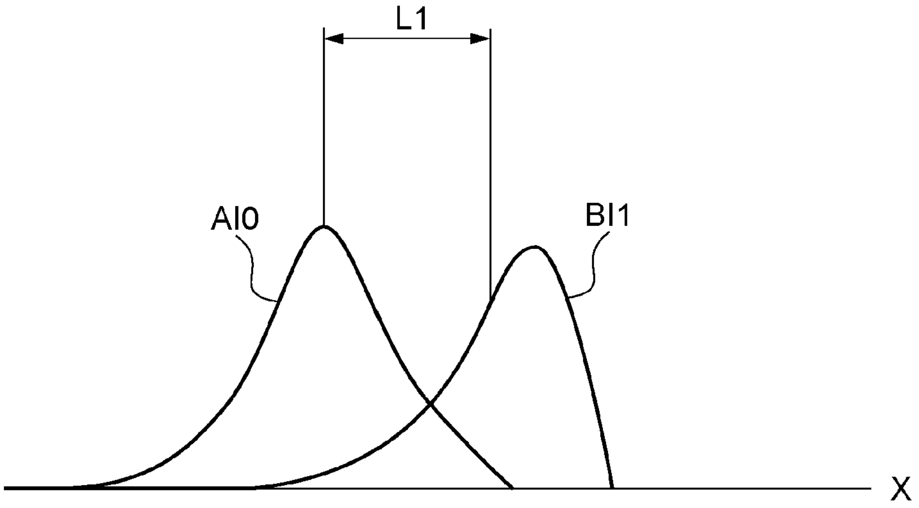

IMAGE-PICKUP APPARATUS AND CONTROL METHOD THEREFOR

TECHNICAL FIELD

The present invention relates to an image-pickup apparatus having a focus detection function based on a phase difference detection method using focus detecting pixels arranged among image-pickup pixels.

BACKGROUND ART

In recent years, upon shooting of a still image or moving image, image pickup while observing an object image formed on image-pickup pixels in a real-time manner, i.e., live-view image pickup, is desired, and its usage has become popular. Upon live-view image pickup, automatic focus detection is performed by the following two methods. One method is active focusing using an external optical system for light projection and light reception. In this method, light projected on an object is received, and the distance from the object is determined from the positional relation of an image formed with the received light. The other method is contrast detection, in which a contrast change with respect to a focus change in an image-pickup optical system is detected in an object image subjected to photoelectric conversion with image-pickup pixels to determine the focus status.

In the active focusing method, it is impossible to perform focusing on an object in a remote position. In the contrast detection method, as a focus position is detected during focusing, it is impossible to quickly drive a focus lens.

Further, as a method for more quick and accurate focus position detection, Japanese Patent Laid-Open No. 60-125814 proposes a combination of a blur-detecting focus detection mechanism and a phase-difference detecting focus detection mechanism.

However, in the technique disclosed in Japanese Patent Laid-Open No. 60-125814, because a part of an object light ray incident on an image sensor is separated and taken into the focus detection mechanism for the purpose of focus position detection, the image-pickup light ray is attenuated.

Accordingly, Japanese Patent Laid-Open No. 2004-191629 proposes an image pickup device using an image sensor having a phase-difference detection focus detection structure which does not require separation of the object light ray. Japanese Patent Laid-Open No. 2004-191629 discloses, in the phase-difference detection focus detection structure on the above-described image sensor plane, correcting the result of focus detection using ray vignetting information of an image-pickup optical system, so as to acquire focusing accuracy.

A ray vignetting status changes in accordance with zoom position or focus position of the image-pickup optical system. To acquire accurate ray vignetting information, it is necessary to grasp the status of the image-pickup optical system. However, some replaceable photographic optical systems are manufactured without consideration of the phase difference detection on the image sensor plane.

SUMMARY OF INVENTION

The present invention has been made in view of the above-described problems, and provides an image-pickup apparatus in which a focus detecting pixel is arranged in a part of an image sensor to perform focus detection based on the phase difference detection method. With this arrangement, it is possible to reduce the frequency of lens driving upon focusing while preventing a hunting phenomenon upon focusing.

The image-pickup apparatus according to a first aspect of the present invention capable of mounting a removable lens unit with an image-pickup optical system including a focus lens thereon, comprises: an image sensor in which an image-pickup pixel to receive a light beam passed through an exit pupil of the image-pickup optical system and a focus detecting pixel to receive a light beam passed through the exit pupil, partially shielded, of the image-pickup optical system are arrayed; focus detection means for detecting a shift amount of the focus lens from a focus position based on a phase difference in an output signal from the focus detecting pixel; and acquisition means for acquiring ray vignetting information of the image-pickup optical system, wherein, when a position detection resolution of the focus lens is lower than a drive resolution of the focus lens, the focus detection means detects the shift amount of the focus lens from the focus position using the ray vignetting information in a predetermined position of the focus lens specified based on information from the lens unit.

The control method for image-pickup apparatus according to a second aspect of the present invention capable of mounting a removable lens unit with an image-pickup optical system including a focus lens thereon, having an image sensor in which an image-pickup pixel to receive a light beam passed through an exit pupil of the image-pickup optical system and a focus detecting pixel to receive a light beam passed through the exit pupil, partially shielded, of the image-pickup optical system, are arrayed, the method comprising: a focus detection step of detecting a shift amount of the focus lens from a focus position based on a phase difference in an output signal from the focus detecting pixel; and an acquisition step of acquiring ray vignetting information of the image-pickup optical system, wherein, when a position detection resolution of the focus lens is lower than a drive resolution of the focus lens, at the focus detection step, the shift amount of the focus lens from the focus position is detected using the ray vignetting information in a predetermined position of the focus lens, specified based on information from the lens unit.

Further features of the present invention will become apparent from the following description of exemplary embodiments with reference to the attached drawings.

BRIEF DESCRIPTION OF DRAWINGS

FIGS. 6A and 6B are graphs showing the electric signal waveform statuses corresponding to change of peripheral image height in the correlated pair of focus detecting pixel groups;

DESCRIPTION OF THE EMBODIMENT

Figure 1:
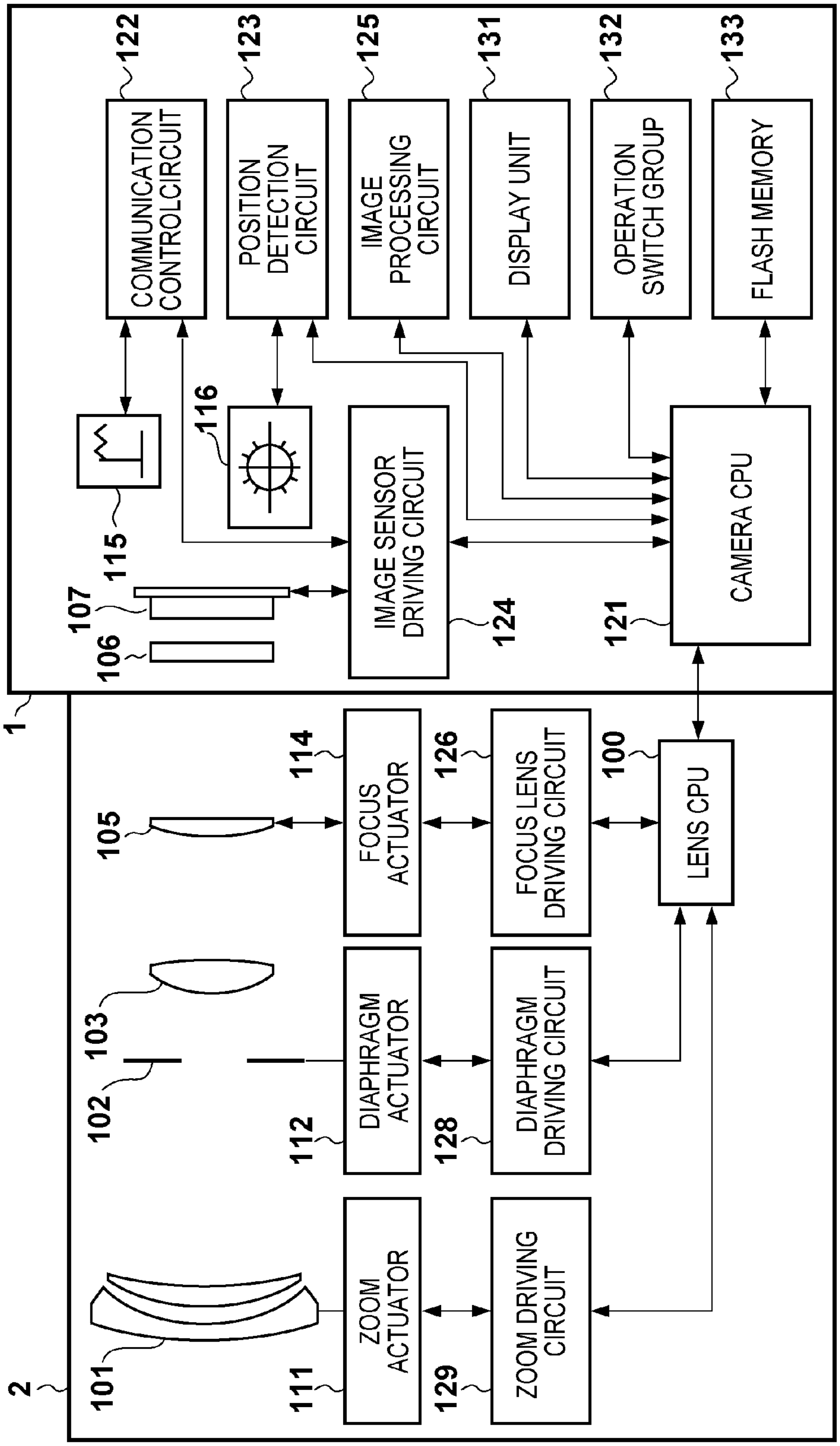
FIG. 1 is a block diagram showing a configuration of a camera in an embodiment of the present invention.

A preferred embodiment of the present invention will now be described in detail in accordance with the accompanying drawings. FIG. 1 is a block diagram showing a configuration of an exchangeable lens type camera as an embodiment of the present invention. The camera, in which a lens unit 2 is removably attached via a mount (not shown) to a camera main body 1, is capable of recording moving images and still images.

In FIG. 1, the lens unit 2 includes an image-pickup optical system having a first lens group 101, a diaphragm 102, a second lens group 103 and a third lens group 105. The first lens group 101, arranged at an end of the image-pickup optical system (image forming optical system), is held movably in an optical axis direction. The diaphragm 102 is used for light amount control upon image pickup by controlling its opening diameter. The diaphragm 102 also has a function as a shutter for exposure time control upon still image pickup. The diaphragm 102 and the second lens group 103 are integrally driven in the optical axis direction, and in collaboration with a moving operation of the first lens group 101, realize a zoom operation (zoom function). The third lens group (focus lens) 105 is used for focusing by movement in the optical axis direction.

Numeral 111 denotes a zoom actuator. The zoom operation is performed by driving the first lens group 101 in the optical axis direction. Numeral 112 denotes a diaphragm actuator to control the opening diameter of the diaphragm 102. Numeral 114 denotes a focus actuator to drive the third lens group 105 in the optical axis direction.

Numeral 100 denotes a lens CPU to transmit/receive information to/from a camera CPU 121 and perform various controls in the lens unit 2 based on the received information.

Numeral 126 denotes a focus lens driving circuit to drive-control the focus actuator 114, and drives the third lens group 105 in the optical axis direction. The camera CPU 121 performs focusing by controlling the driving of the third lens group 105 via the lens CPU 100. Numeral 128 denotes a diaphragm driving circuit to control the opening of the diaphragm 102 by drive-controlling the diaphragm actuator 112. The camera CPU 121 controls the image-pickup light amount by controlling the opening diameter of the diaphragm 102 via the lens CPU 100, and controls exposure time upon still image pickup. Numeral 129 denotes a zoom driving circuit to drive-control the zoom actuator 111, and drives the first lens group 101 in the optical axis direction. The lens CPU 100 controls the focus lens driving circuit 126, the diaphragm driving circuit 128 and the zoom driving circuit 129 based on the information received from the camera CPU 121.

Next, the configuration of the camera main body 1 will be described. Numeral 106 denotes an optical low-pass filter which is an optical device to reduce false color and/or moiré of a photographed image. Numeral 107 denotes an image sensor having a C-MOS sensor and its peripheral circuits. As the image sensor 107, used is a two-dimensional single-plate color sensor having an on-chip formed Bayer pattern color mosaic filter with a square array of horizontal M and vertical N photoelectric pixels.

Numeral 115 denotes a radio communication unit having an antenna, a signal processing circuit and the like for communication with a server computer via a network such as the Internet. Numeral 116 denotes a camera position detection unit having an electronic leveling instrument for determining image-pickup position of the camera, i.e., landscape image pickup or portrait image pickup.

The camera CPU 121 has an operation unit, a ROM, a RAM, an A/D converter, a D/A converter, a communication interface circuit and the like for various controls in the camera main body. The camera CPU 121 drives various circuits of the camera based on a predetermined program stored on the ROM, to perform a series of operations including AF, image-pickup, image processing and recording. Numeral 122 denotes a communication control circuit to transmit a photographed image to the server computer and receive images and various information from the server computer via the radio communication unit 115.

Numeral 123 denotes a position detection circuit to determine the position of the camera from an output signal from the position detection unit 116. Numeral 124 denotes an image sensor driving circuit to control an image-pickup operation of the image sensor 107 and A/D-convert an acquired image signal and transmit the converted signal to the camera CPU 121. Numeral 125 denotes an image processing circuit to perform processing such as $\gamma$ conversion, color interpolation and image compression on the image acquired with the image sensor 107.

Numeral 131 denotes a display unit such as an LCD to display information on camera image-pickup mode, a preview image upon image pickup and a check image after the image pickup, a focused-status display image upon focus detection, camera position information and the like. Numeral 132 denotes an operation switch group including a power switch, an image-pickup start switch, a zoom operation switch, an image-pickup mode selection switch and the like. Numeral 133 denotes a removable flash memory for storing photographed images.

A conventional focus detection optical system has a pair of optical systems for phase difference detection. The respective optical systems read a part of a pupil range of the image-pickup optical system. Then, from the correlation between photoelectric conversion signals of images incident on the respective photoelectric conversion elements, the status of phase difference (the relative positional relation between two images (image A and image B)) is detected. With this phase difference, a focus position of an object image formed via the image-pickup optical system is detected. At this time, the relation of the phase shift amount with respect to the focus position shift amount is determined with the structure of the focus detection optical system, and it is determined as long as a so-called base length is known.

Assuming that the distance between the correlated image A and the image B (image shift amount) is L, and a defocus amount is denoted DEF, $K=L/DEF$ holds, where K is the base length. Upon calculation of the base length, it is necessary to obtain the optical characteristic and electrical characteristic of the image-pickup optical system and the focus detecting pixel.

More particularly, it is necessary to obtain optical vignetting information to obtain an exit pupil shape of the image-pickup optical system, the relation of a pupil image from the focus detecting pixel projected on the position, and photoreception angle intensity distribution information upon photoreception with the focus detecting pixel from the exit pupil.

In a conventional phase-difference detection type focus detection apparatus, when the image-pickup optical system is used, aperture value is set to a predetermined brightness (effective F number). Accordingly, a shielding member is arranged in the focus detection optical system, such that when the photoreception angle range of the focus detecting pixel is brighter than the predetermined effective F number, photoreception is performed within the entire range. Accordingly, as the base length information necessary for the focus position detection is not varied, unique base length information of the image-pickup apparatus is stored.

However, in recent years, many single-lens reflex cameras, having a live-view image-pickup function for photographing while observing an object image on an image sensor with an external liquid crystal display board or an electronic view finder in a real-time manner, have been commercialized. Upon live-view image-pickup, it is necessary to change the aperture value (effective F number value) of the image-pickup optical system in correspondence with change of brightness of an object image. Accordingly, the above-described focusing in the always-opened state cannot be performed.

The problem is that the pupil range is reduced as the effective F number of the image-pickup optical system is increased, and ray vignetting occurs within the pupil range in the focus detection optical system. In such a state, an image signal input to the focus detection optical system is changed, and the above-described relation of the phase shift change amount with respect to the focus position shift amount (base length) is changed.

Next, the structure and photoreception characteristic of the focus detecting pixel used in the present embodiment will be described.

Figure 2:
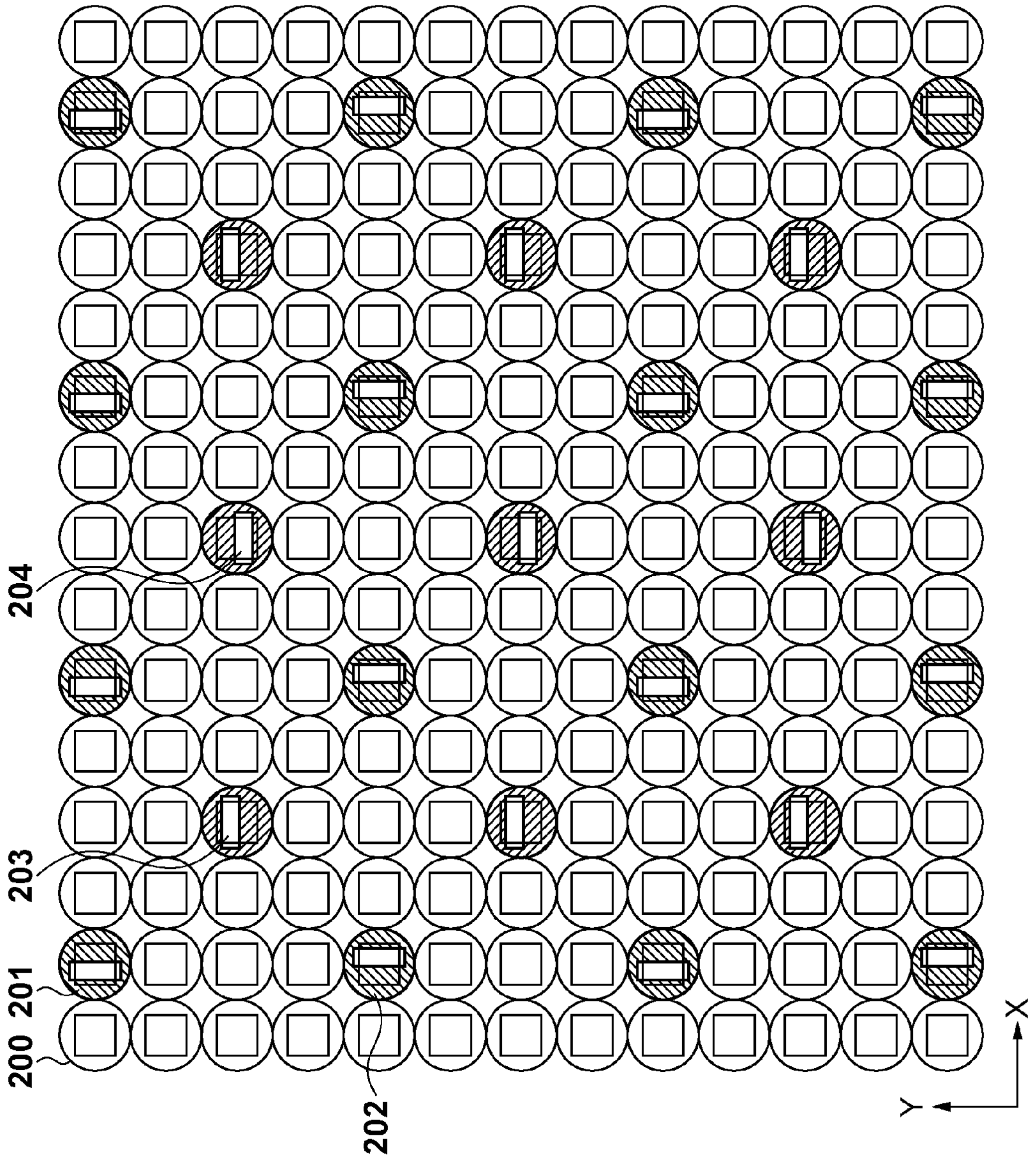
FIG. 2 illustrates a pixel array of an image sensor.

FIG. 2 illustrates a pixel array structure of the image sensor in the present embodiment. In FIG. 2, pixels denoted by numeral 200 belong to an image-pickup pixel group for formation of a photographed image, and pixels denoted by numerals 201 to 204, a focus detecting pixel group having a light shielding structure utilizing a technique disclosed in e.g. Japanese Patent Laid-Open No. 2009-244862. The image-pickup pixel group receives a light beam passed through the exit pupil of the image-pickup optical system, and the focus detecting pixel group receives a light beam from the exit pupil, which is partially shielded, of the image-pickup optical system.

Note that in FIG. 2, a pixel group arrayed in line in a direction Y, denoted by numeral 202, detects a focus position of a horizontal stripe-patterned object by the phase difference method, using a photoelectric conversion signal waveforms as a pair of correlation operation signals for phase difference detection, as in the case of the pixel group 201. Similarly, regarding a vertical stripe-patterned object, correlation operation is performed with the output signal waveforms as described above using the pixel group 203 and the pixel group 204 arrayed in a direction X in FIG. 2, to detect the focal point of the object.

Next, the influence on the base length by focusing at a central image height with respect to a change of effective F number in the image-pickup optical system will be described using FIGS. 3A and 3B and FIGS. 4A and 4B. In the following description, the image-pickup optical system has a ring-shaped opening.

Figure 3A:
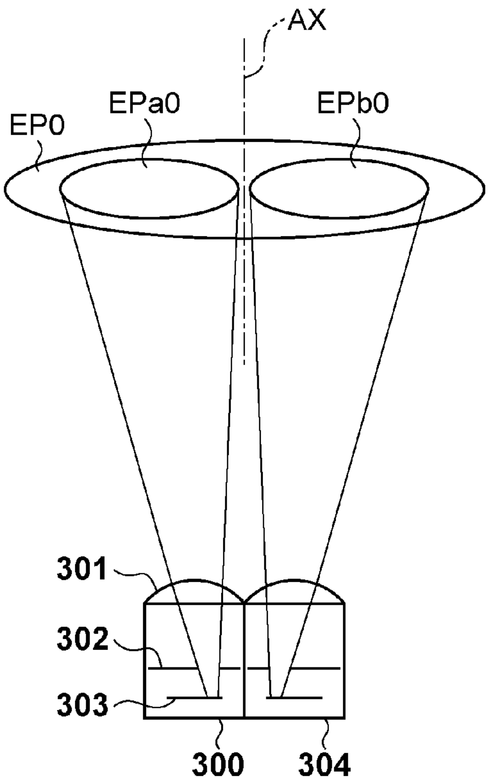
FIGS. 3A and 3B are explanatory views of pupil projection corresponding to effective F number change in a focus detecting pixel at a central image height.
Figure 3B:
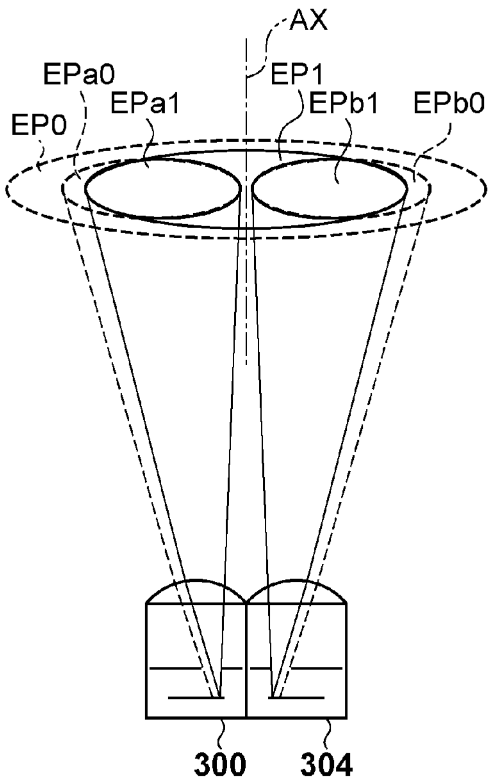

FIGS. 3A and 3B are explanatory views showing the relation of the pupil projection image from the focus detecting pixel with respect to the exit pupil of the image-pickup optical system corresponding to change of effective F number. FIG. 3A shows a status when the effective F number value is small, and FIG. 3B, a status when the effective F number value is changed in an increasing direction. In FIGS. 3A and 3B, numerals 300 and 304 denote focus detecting pixels for image A and image B; 301, a micro lens; 302, a shielding member; and 303, a photoelectric conversion unit.

Numeral EP0 denotes the exit pupil of the image-pickup optical system in a status where the effective F number value is small (bright); EP1 denotes the exit pupil of the image-pickup optical system in a status where the effective F number value is changed in the increasing (darkened) direction. Further, AX denotes an optical axis of the image-pickup optical system; EPa0 and EPb0 denote pupil projection images from the focus detecting pixels for the image A and the image B; and EPa1 and EPb1 denote pupil projection images from the focus detecting pixels for the image A and the image B, when the valid ranges are reduced upon change of the effective F number value in the increasing (darkened) direction.

Figure 4A:
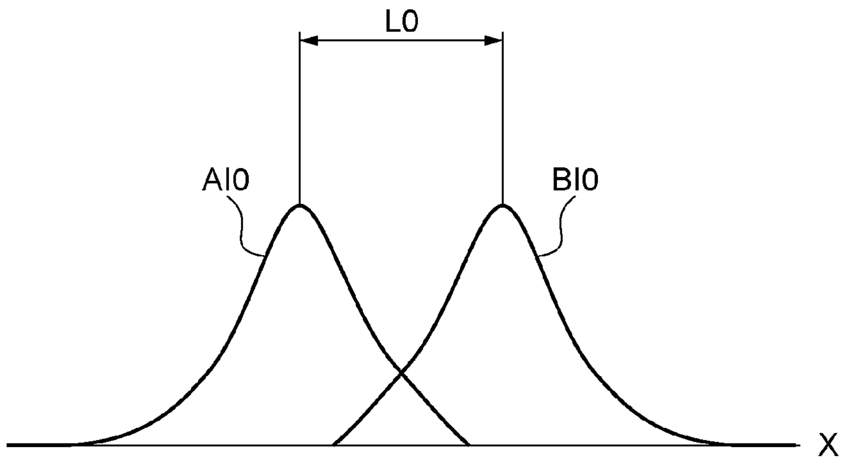
FIGS. 4A and 4B are graphs showing electric signal waveform statuses corresponding to peripheral image height change in a correlated pair of focus detecting pixel groups.
Figure 4B:
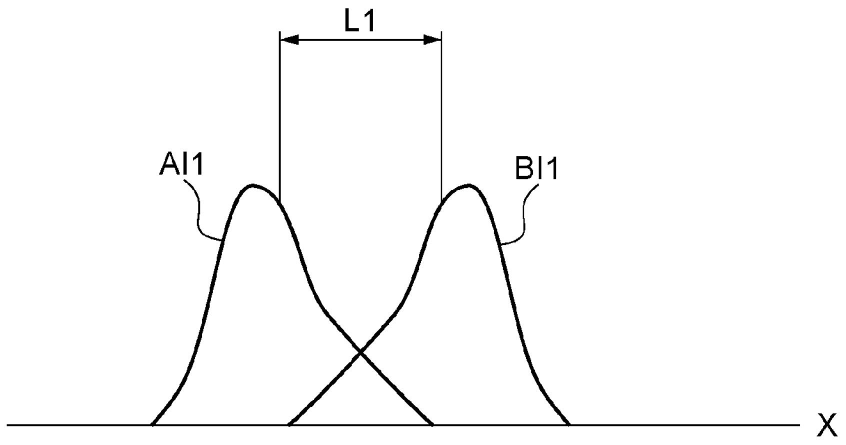

The focus detecting pixels are arrayed in line as described in FIG. 2, to interpolate the photoelectric conversion signals from the respective focus detecting pixels and generate a pair of electric signal waveforms for correlation operation as described below. FIGS. 4A and 4B are graphs showing output waveforms from the focus detecting pixel groups for the images A and B in the states of FIGS. 3A and 3B.

Note that FIG. 4A shows the output waveforms corresponding to FIG. 3A when the effective F number value is small. Numerals AI0 and AI0 denote interpolate-combined output signals from the focus detecting pixel groups for the image A and the image B, and L0, a distance between the signal intensity central positions of the respective waveforms. Similarly, FIG. 4B shows the electric signal waveforms corresponding to the photoelectric conversion signals from the focus detecting pixels in FIG. 3B. Numerals AI1 and BI1 denote interpolate-combined output signals from the focus detecting pixel groups for the image A and the image B.

Note that as shown in FIG. 3B, ray vignetting occurs in the pupil projection images from the focus detecting pixels for the image A and the image B. The output waveforms AI1 and BI1 are asymmetric shapes, the signal intensity central positions are changed in the direction of an optical axis AX of the image-pickup optical system with respect to FIG. 4A, and a distance L1 between the signal intensity central positions is shorter than the distance L0. Accordingly, as described above, in the state of FIG. 3B, the base length is shortened as the effective F number value is increased from the status of FIG. 3A.

Figure 5A:
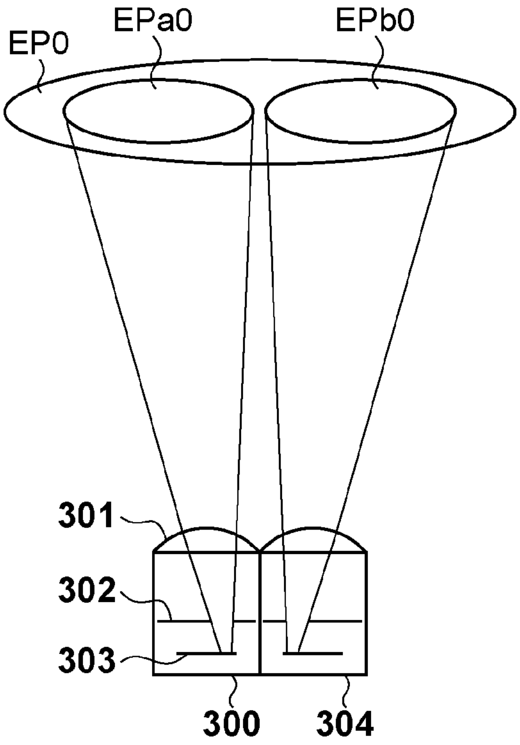
FIGS. 5A and 5B are explanatory views of pupil projection corresponding to change of image height in the focus detecting pixel at a peripheral image height.
Figure 5B:
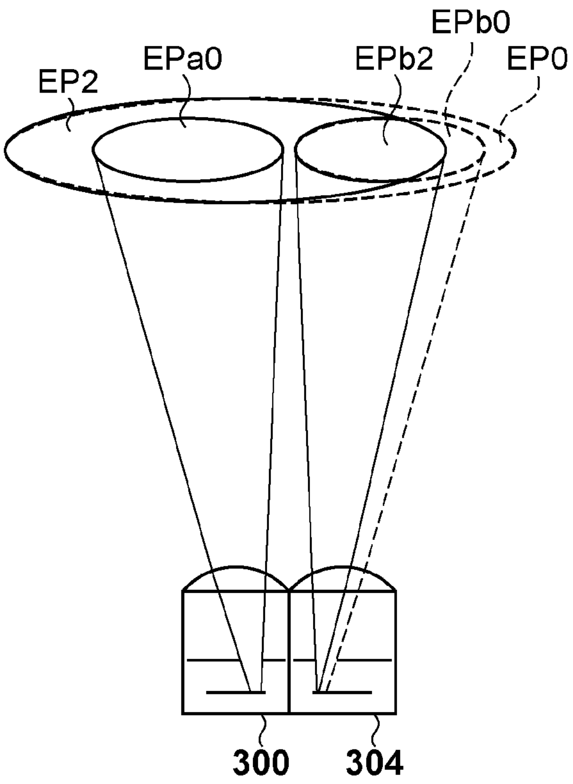

Next, the influence of the base length upon focusing at a peripheral image height will be described using FIGS. 5A and 5B and FIGS. 6A and 6B. FIG. 5A shows the relation between the pupil projection images from the focus detecting pixels at a low image height position in the focusing and the exit pupils of the image-pickup optical system. FIG. 5B shows the relation between the pupil projection images from the focus detecting pixels at a higher image height position in the focusing and the exit pupils of the image-pickup optical system. In FIG. 5B, numeral EP2 denotes an exit pupil shape upon exit of light beam at a high image height from the image-pickup optical system. Numeral EPb2 denotes a pupil projection image from the focus detecting pixel for the image B when the image height upon focusing is high.

Note that the exit pupil shape EP2 is deformed from a circular shape to a partially waned shape from the image height change direction due to the occurrence of ray vignetting in the lens barrel of the image-pickup optical system in accordance with increase in the image-pickup image height. As a result, the ray vignetting status occurs in the pupil of one of the focus detecting pixels for the images A and B (in FIG. 5B, the focus detecting pixel for the image B).

FIGS. 6A and 6B are graphs showing the output waveforms from the focus detecting pixel groups for the images A and B in the states of FIGS. 5A and 5B. FIG. 6A shows a state where the image height position where the focus detecting pixels are arranged is low. Numerals AI0 and BI0 denote interpolate-combined output signals from the focus detecting pixel groups for the image A and the image B. Further, numeral L0 denotes a distance between the signal intensity central positions of the respective waveforms. Similarly, FIG. 6B shows the electric signal waveforms corresponding to the photoelectric conversion signals from the focus detecting pixels in FIG. 5B. Numerals AI1 and BI1 denote interpolate-combined output signals from the focus detecting pixel groups for the image A and the image B.

Note that in the pupils of the focus detecting pixels for the image A and the image B, as ray vignetting occurs in the focus detecting pixel group for the image B as shown in FIG. 5B, the output waveform BI1 has an asymmetrical shape. Accordingly, the signal intensity central position is changed to be closer to the central position of the AI0 with respect to the image BI0 in FIG. 6A. The distance L1 between the signal intensity central positions is shorter than the distance L0. Accordingly, as described above, in the state of FIG. 6B, the base length is shortened as the ray vignetting in the lens barrel of the image-pickup optical system is increased with respect to the state of FIG. 6A.

As described above, the set base length value is changed due to the ray vignetting status. Then the error amount from an ideal focus shift amount from a defocus status to a focus status is determined. Further, the nature of the problem differs in accordance with the error amount with respect to the ideal focus shift amount.

Figure 7A:
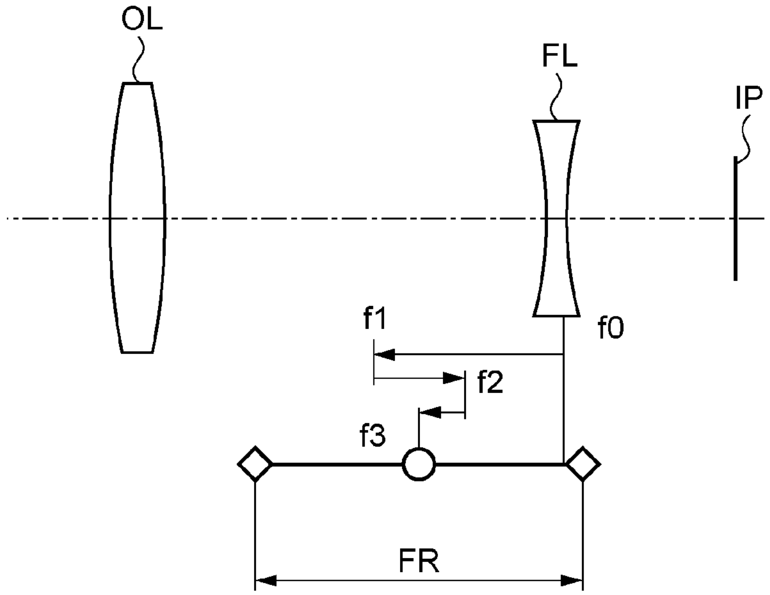
FIGS. 7A and 7B are explanatory views of focus lens driving to attain a focus status in an image-pickup optical system.
Figure 7B:
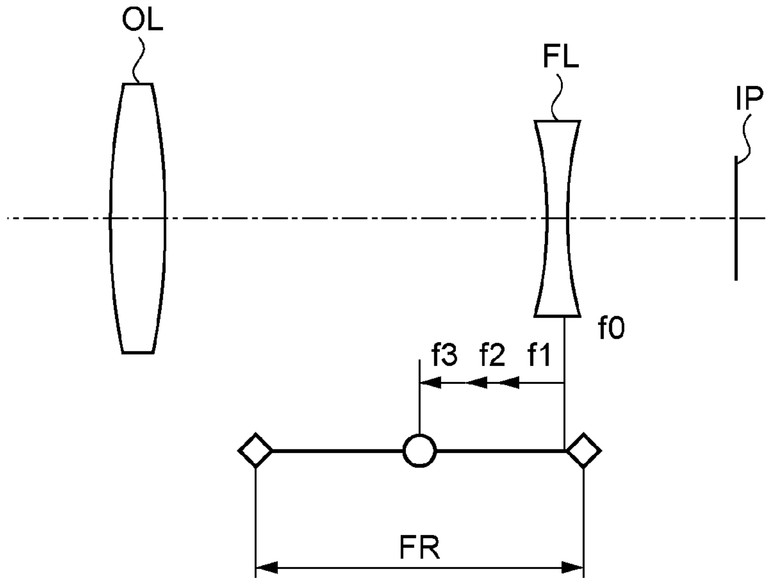

Next, the nature of the problem will be described. FIGS. 7A and 7B are explanatory views of focus lens driving states to focus in an image-pickup optical system. In FIGS. 7A and 7B, OL denotes an objective lens group of the image-pickup optical system; FL a focus lens group; and IP an image plane where the image sensor is arranged. Further, FR denotes a focus lens shift range for focusing by the focus lens group FL from infinity to a closest object. Numerals f0 to f3 denote transition of a focus stop position in plural times of focus lens driving to the focused status.

FIG. 7A shows the outline of a problem when an error occurs in the driving amount for the focus lens driving at once. The problem occurs when the focus lens is shifted from the position f0 to the position f1 and from the position f1 to the position f2 in FIG. 7A, jumping over an optimum focus position since the driving amount is too large. Then, after the jump, the moving direction is undesirably reversed so as to repeat the focus shift.

Such an operation is undesirable from the following reasons.

(1) In the object image, the image-formation magnification change and the blur amount change corresponding to focus shift differ upon reverse of focus shift direction, and sensory quality is degraded.

(2) When a gear is used in a focus lens driving mechanism, the accuracy of a stop position of the focus lens group is lowered due to the influence of backlash upon reverse.

(3) The repetition of jumping over the threshold range of focus causes a hunting phenomenon in the focus lens driving.

(4) In the above-described (3), accurate focusing cannot be performed even when the driving is stopped.

On the other hand, FIG. 7B shows a case where a calculated focus lens driving amount is smaller than a necessary focus lens moving amount. In this case, the focus lens driving direction to the focused state is, as indicated with arrows from the position f0 to the position f1, from the position f1 to the position f2, and from the position f2 to the position f3 in FIG. 7B, in the same direction.

Accordingly, the focus lens infallibly arrives at a focus determination position, and at the same time, as the state change of the object image is the same during the focus lens driving, the sensory quality is high. Note that when the focus lens driving amount is too small, it is necessary to perform the focus lens driving many times. In such case, it undesirably takes time to reach the focused state.

Next, the base length necessary for determination of the above-described focus lens driving amount will be described. The base length is obtained as follows. First, an electric signal by light ray incidence from the pupil range inputted in the focus detecting pixels of the A pixel group and the B pixel group is scanned by a predetermined amount in a one-dimensional direction (focusing length direction). Then, the centers of the A signal and B signal intensity waveform distributions from the A pixel group and the B pixel group are obtained from the electric signal distributions, and the change of the distance between the central positions due to the focus position change is obtained.

Conventionally, base length information is stored in an image-pickup apparatus. Upon focus detection, a current focus position is calculated from the correlation between electric output waveforms from the pair of A and B focus detecting pixel groups. Then a defocus amount (the shift amount of the focus lens from the focus position) is obtained, and a driving amount for the focus lens is obtained for focusing. At this time, when ray vignetting occurs in the A pixel or B pixel pupil in accordance with the positional change of the focus detecting pixel, the A and B signal intensities become asymmetric. This changes the change state of the distance between the central positions in the waveform distributions in accordance with focus position change.

At this time, as the pupil diameter is reduced due to the occurrence of the ray vignetting, the distance between the central positions is reduced when the ray vignetting is increased. Accordingly, as the base length is short when the amount of ray vignetting is large, it is determined that as the focus shift amount for focusing by a predetermined defocus amount, a large shift amount is necessary with respect to the base length information when the amount of ray vignetting is small. As a result, the above-described problem of jumping occurs in the focus lens driving.

To prevent the problem, it is necessary to accurately obtain ray vignetting information of the exit pupil of the image-pickup optical system which currently performs focusing. The status of ray vignetting of the image-pickup optical system is changed in accordance with change of iris diaphragm diameter or change of focus position. Further, in a case where the image-pickup optical system is a zoom type system, the status of ray vignetting is changed in accordance with change of effective F number and state change in the lens barrel of a moving lens group by change of focal distance upon zooming.

Nowadays, in an exchangeable lens type image-pickup apparatus, an information communication unit is used to display information on the image-pickup optical system such as a focal distance on the camera side from the image-pickup optical system, and to provide accurate focus correction information upon focusing and the like. The image-pickup optical system is often provided with, as a unit for position detection of the focus lens group and focal position detection, a unit to divide a movable range and perform detection, using a pattern-detection type encoder or the like for position detection of the lens group which is moved upon zooming or focusing.

However, in a phase difference detection system having focus detecting pixels on an image sensor plane as in the case of the present embodiment, it is necessary to store ray vignetting information corresponding to minute state changes so as to improve focusing accuracy. Accordingly, an enormous amount of data is held.

Further, there is the following problem. For example, upon use of an existing exchangeable lens on sale in the past, made without consideration of image-sensor focus detection, the focus division and the zooming division range are already fixed and not optimized to the focus detection of the present embodiment.

Figure 8:
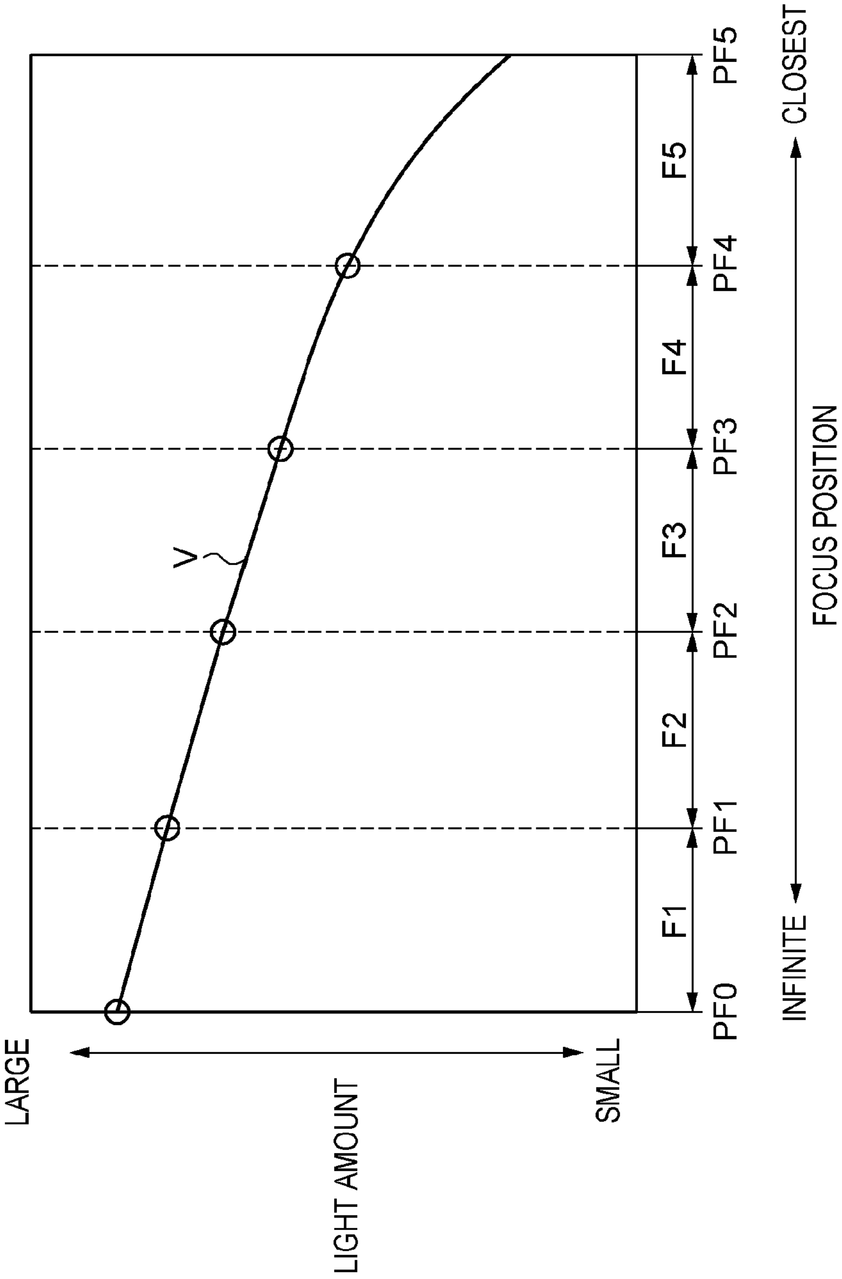
FIG. 8 is a graph showing marginal lumination corresponding to change of ray vignetting in accordance with focus position of the image-pickup optical system.

Next, the relation between the focus lens position and the state of ray vignetting will be described. FIG. 8 is a graph showing the change of marginal lumination (change of ray vignetting) upon moving of the focus lens in accordance with change of distance from an object. In this example, the focus shift range is divided into five blocks, F1 to F5, and numerals PF0 to PF5 denote border positions of respective divided blocks. In FIG. 8, V denotes a curve indicating the change of effective F number in accordance with focus position change of the image-pickup optical system or the change of light amount due to ray vignetting in the focus lens barrel at a peripheral image height.

Note that in the respective blocks, it is possible to detect a block in which the focus lens is positioned. At this time, it is desirable to adopt the smallest amount of vignetting within a range where the focus lens might be stopped. In the image-pickup optical system having the characteristic as shown in FIGS. 3A and 3B, when the focus lens position is within F1, the ray vignetting information in the position PF0 is used. Further, when the focus lens position is within F2, the ray vignetting information in the position PF1 is used; when the focus lens position is within F3, the ray vignetting information in the position PF2 is used; when the focus lens position is within F4, the ray vignetting information in the position PF3 is used; and when the focus lens position is within F5, the ray vignetting information in the position PF4 is used.

Accordingly, within the focus lens position range in which the change of focus lens position cannot be detected, the base length is calculated using ray vignetting information in a focus lens position in which the amount of ray vignetting is the smallest in the focus lens position range and photoreception angle intensity distribution information of the focus detection device, and the focus position detection is performed from the calculated base length information.

With the above arrangement, as the base length is determined based on information showing the smallest amount of ray vignetting within a range of possibility of existence of the focus lens, it is possible to perform focusing while moving in a predetermined moving direction with preventing overrun of the focus lens driving. Further, it is possible to provide an image-pickup apparatus in which the inconvenience that the base length, calculated from the ray vignetting information, is too short, is prevented, and the focusing too many times by small-amount driving of the focus lens is prevented, and further, the reverse-driving of the focus lens and the hunting phenomenon are prevented.

Note that when the image-pickup optical system attached to the present image-pickup apparatus uses single-focus for-element focusing or helicoids focusing, as the relation between focus shift and focus position change amount is simple, focus division may be omitted. However, in such optical system, the entire driving range of the focus lens is regarded as one block, and ray vignetting information in a focus position in which the amount of ray vignetting is the smallest is used within the range (region).

Note that the ray vignetting information means information on an exist pupil shape of the image-pickup optical system which is unique information in accordance with focal distance upon focusing with the image-pickup optical system, focus position, iris diaphragm state and focus-position image-formation height position condition. As an expression of the shape, the contour shape of the exit pupil shape may be stored as coordinate information, otherwise, it may be arranged such that ray effective diameter information of the image-pickup optical system and plural pupil information to regulate ray is stored, then the exit pupil shape of the image-pickup optical system is formed by combining by operation from the information. Further, this information may be stored as coefficients approximated by e.g. higher order expressions or may be stored as a multidimensional array numerical value map.

Further, nowadays, upon focus detection, reading a focus detection signal during driving of a focus lens in accordance with focus drive amount information and updating the focus drive amount information (overlap control) is adopted in many cases.

Here, regarding moving-subject tracking image pickup, it is presumed that the focus lens is moved in a direction from a current necessary focus drive amount for the object to a reduced drive amount. At this time, when a determination unit to determine the determination of possibility of overlap control is provided, it is necessary to prevent overrun of the focus lens. When the state of the currently acquired ray vignetting exceeds a predetermined value and it is determined as a result of determination of the possibility of overlap control that the overlap control is impossible, it is advantageous to set the focus lens drive amount to a value smaller than the currently set amount.

Figure 9:
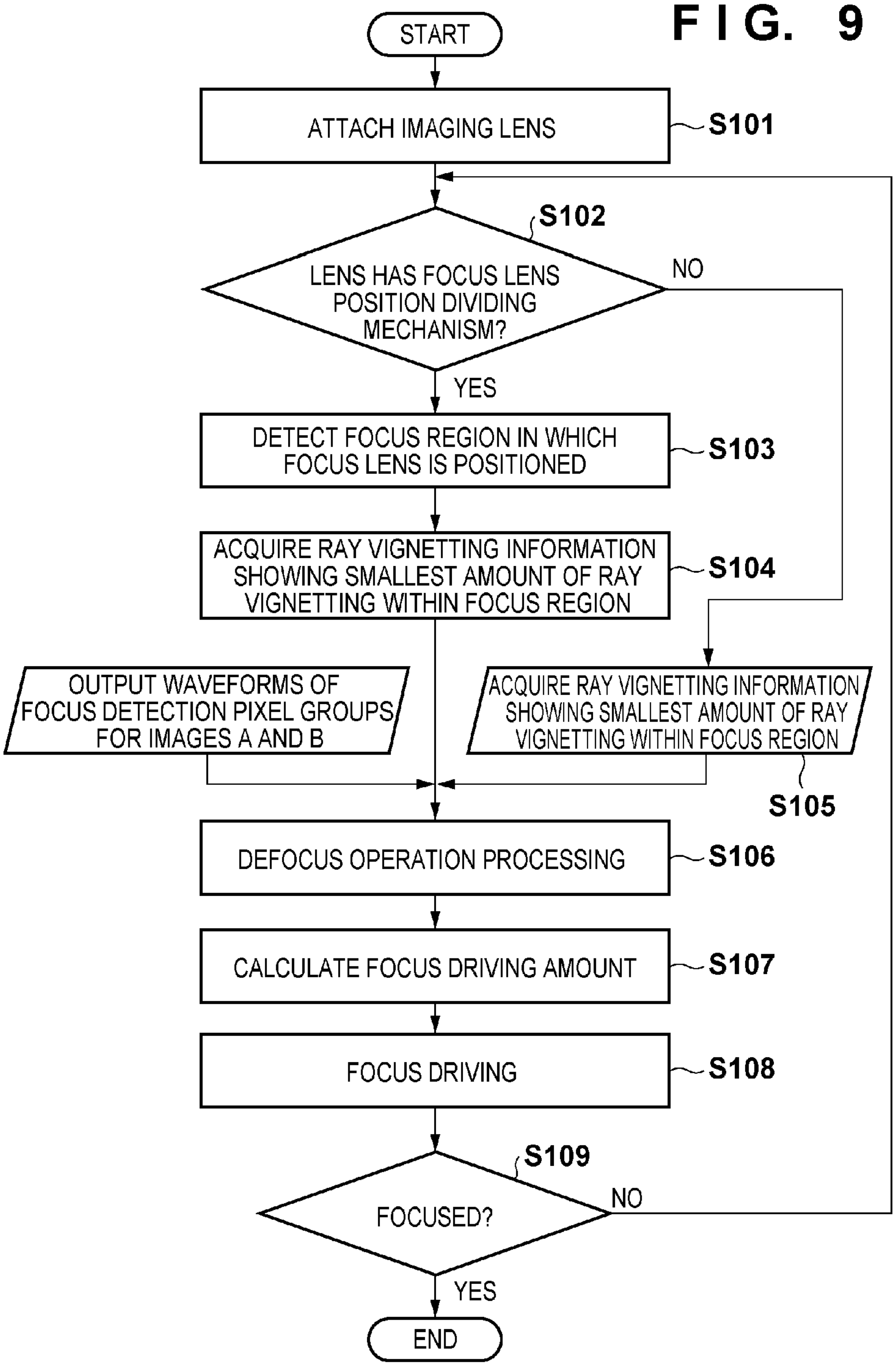
FIG. 9 is a flowchart showing the flow of a focus detection operation.

Next, the flow of focusing processing using the method of the present embodiment will be described. FIG. 9 is a brief flowchart regarding the focusing of a camera as the image-pickup apparatus shown in FIG. 1. In this example, in an exchangeable-lens type image-pickup apparatus, a state in which an exchangeable lens unit is removed is an initial status.

When a photographer turns on the power switch, the camera CPU 121 checks operations of the respective actuators and the image sensor in the camera, initializes memory contents and programs to be executed, and performs an image-pickup preparatory operation. Step S101 is performed when the photographer has attached the exchangeable lens to the camera, to determine that the lens unit has been attached to the camera.

At step S102, it is determined whether or not the attached lens unit is a lens unit having a focus lens position dividing mechanism, and the destination of branched processing is selected based on the existence/absence of the dividing mechanism. When it is determined at step S102 that there is a focus lens position dividing mechanism, the focus region where the focus lens is positioned is detected at step S103. At step S104, ray vignetting information with the smallest ray vignetting amount within the focus region is selected based on the focus lens position information acquired at step S103.

Regarding the ray vignetting information, ray vignetting amount is obtained from the effective F number set in the camera, image height information for focusing and barrel frame information acquired from lens unit, and light ray vignetting information with the smallest amount of light ray vignetting is selected. Further, it may be arranged such that with respect to respective areas previously divided as effective F number, image height and focus regions in each lens unit, ray vignetting information with the smallest amount of ray vignetting is stored as multidimensional array data in the camera or the lens unit. This arrangement reduces operation load.

Further, at step S105, when it is determined at step S102 that the lens unit lacks a focus lens position dividing mechanism, ray vignetting information in which the amount of ray vignetting becomes the smallest within the movable range of the focus lens is acquired. At step S106, the base length is calculated from the ray vignetting information acquired at step S104 or S105 and the photoreception angle intensity distribution information of the focus detecting pixels for the image a and the image B in the image-pickup optical system. Then, defocus operation processing is performed by correlation operation between the photoelectric conversion signal waveforms for the image A and the image B.

At step S107, the focus lens drive amount is calculated from the information on the defocus amount obtained at step S106 and the relation between the focus change amount and the focus lens moving amount. At step S108, processing to drive the focus lens is performed by the focus lens drive amount obtained at step S107.

At step S109, focus determination is performed. When focus status is determined, the processing is terminated, while it is determined that the current status is not the focus status yet, the process returns to step S102 to repeat the processing. Generally, the focus determination at step S109 is made based on determination as to whether or not the focus shift amount is within an allowable defocus amount range. Accordingly, the focus lens driving in the same direction as in the case of the present embodiment infallibly obtains the focus status.

Further, the flowchart of FIG. 9 shows processing on focus divided status of the lens unit. However, upon processing in consideration of zoom divided and focus driven states, assuming that the ray vignetting information has data two-dimensionally arranged based on zoom position and focus position, a processing step to detect a current zoom position is added between step S101 and step S102. Then, focus information with the smallest amount of ray vignetting is selected with respect to the current zoom position.

As described above, according to the present embodiment, in an image-pickup apparatus using an image sensor with a phase-difference focus detection unit, it is possible to prevent a hunting phenomenon upon focusing and reduce the frequency of focus lens driving to a focused status.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-093509, filed Apr. 19, 2011 and 2012-059105, filed Mar. 15, 2012, which are hereby incorporated by reference herein in their entirety.

The invention claimed is:

1. An image-pickup apparatus capable of mounting a removable lens unit with an image-pickup optical system including a focus lens thereon, comprising:

an image sensor in which an image-pickup pixel to receive a light beam passed through an exit pupil of the image-pickup optical system and a focus detecting pixel to receive a light beam passed through the exit pupil, partially shielded, of the image-pickup optical system, are arrayed;

focus detection means for detecting a shift amount of said focus lens from a focus position based on a phase difference in an output signal from said focus detecting pixel; and acquisition means for acquiring ray vignetting information of said image-pickup optical system, wherein, when a position detection resolution of said focus lens is lower than a drive resolution of said focus lens, said focus detection means detects the shift amount of said focus lens from the focus position using the ray vignetting information in a predetermined position of said focus lens specified based on information from said lens unit.

2. The image-pickup apparatus according to claim 1, wherein said focus detection means calculates an amount of ray vignetting using the information from said lens unit, and specifies said predetermined position of said focus lens based on the amount of ray vignetting.

3. The image-pickup apparatus according to claim 1, wherein said focus detection means calculates the amount of the ray vignetting using the information from said lens unit, and in a position range in which position detection of said focus lens cannot be performed, specifies a position of said focus lens in which the calculated amount of the ray vignetting is the smallest as said predetermined position of said focus lens.

4. The image-pickup apparatus according to claim 1, wherein said ray vignetting information is information on an exit pupil shape of the image-pickup optical system.

5. The image-pickup apparatus according to claim 1, wherein said ray vignetting information is determined based on a focal distance of the image-pickup optical system, a position of said focus lens, a state of a diaphragm, and an image-forming height position condition in a focusing position.

6. The image-pickup apparatus according to claim 1, wherein said predetermined position of said focus lens is the position of said focus lens in which the amount of the ray vignetting is the smallest in a position range in which position detection of said focus lens cannot be performed.

7. The image-pickup apparatus according to claim 3, wherein the position range in which the position detection of said focus lens cannot be performed is a range of each of the regions divided from a movable range of said focus lens.

8. The image-pickup apparatus according to claim 1, further comprising storage means for storing the ray vignetting information by said lens unit.

9. A control method for an image-pickup apparatus capable of mounting a removable lens unit with an image-pickup optical system including a focus lens thereon, having an image sensor in which an image-pickup pixel to receive a light beam passed through an exit pupil of the image-pickup optical system and a focus detecting pixel to receive a light beam passed through the exit pupil, partially shielded, of the image-pickup optical system, are arrayed, said method comprising:

a focus detection step of detecting a shift amount of said focus lens from a focus position based on a phase difference in an output signal from said focus detecting pixel; and an acquisition step of acquiring ray vignetting information of said image-pickup optical system, wherein, when a position detection resolution of said focus lens is lower than a drive resolution of said focus lens, at said focus detection step, the shift amount of said focus lens from the focus position is detected using the ray vignetting information in a predetermined position of said focus lens, specified based on information from said lens unit.

* * * * *